(12) United States Patent
Someya

(10) Patent No.: US 7,271,842 B2
(45) Date of Patent: Sep. 18, 2007

(54) VIDEO SIGNAL PROCESSING CIRCUIT AND METHOD FOR CONVERTING NUMBER OF SCAN LINES AND IMAGE DISPLAY DEVICE USING THE SAME

(75) Inventor: Ikuo Someya, Tokyo (JP)

(73) Assignee: Sony Corporation (JP)

( * ) Notice: Subject to any disclaimer, the term of this patent is extended or adjusted under 35 U.S.C. 154(b) by 7 days.

(21) Appl. No.: 11/093,567

(22) Filed: Mar. 30, 2005

(65) Prior Publication Data

US 2005/0168636 A1 Aug. 4, 2005

Related U.S. Application Data

(63) Continuation of application No. 10/170,036, filed on Jun. 12, 2002, now Pat. No. 6,927,800.

(30) Foreign Application Priority Data

Jun. 14, 2001 (JP) ............................ P2001-180550
Jun. 6, 2002 (JP) ............................ P2002-166105

(51) Int. Cl.
*H04N 11/00* (2006.01)
(52) U.S. Cl. ........................ 348/458; 348/556; 348/558
(58) Field of Classification Search ................ 348/458, 348/448, 581, 556, 441, 714–718; 345/660, 345/662, 667, 698; 358/3.2, 451; 382/298–300
See application file for complete search history.

(56) References Cited

U.S. PATENT DOCUMENTS 4,673,981 A * 6/1987 Lippman et al. ............ 348/441
5,168,362 A 12/1992 Yoshida et al.
5,200,840 A * 4/1993 Koike et al. ................. 358/451
5,452,093 A * 9/1995 Kwak ......................... 358/296
5,592,220 A * 1/1997 Ishii et al. ................ 348/220.1
5,986,635 A * 11/1999 Naka et al. .................. 715/716
6,522,339 B1 2/2003 Orimo et al.
6,525,778 B1 * 2/2003 Suzuki ........................ 348/556
6,704,463 B1 3/2004 Okada et al.

FOREIGN PATENT DOCUMENTS

| JP | 06-253269 | 9/1994 |
| JP | 08-265666 | 10/1996 |
| JP | 11-168639 | 6/1999 |

* cited by examiner

*Primary Examiner*—Victor R. Kostak
(74) *Attorney, Agent, or Firm*—Lerner, David, Littenberg, Krumholz & Mentlik, LLP

(57) ABSTRACT

A double-rate signal achieved by subjecting a video signal to double-rate conversion is supplied to a scan line number converter. In the converter, the portion of the effective scan lines of the double-rate signal is written into a frame memory on the basis of a signal achieved by multiplying horizontal and vertical synchronous signals based on the double-rate signal. In the effective scan line section of HDTV signal, the video signal written in the frame memory is read out on the basis of horizontal and vertical reference signals based on the HDTV signal. Out of the effective scan line section of the HDTV signal, a pedestal level signal written in a memory is read out on the basis of the horizontal and vertical reference signals based on the HDTV signal, thereby achieving HDTV signal whose vertical scan line number is equal to 1125 lines. Accordingly, the HDTV signal suffers no degradation because the video signal in the section of 960 effective scan lines of the double-rate signal is not interpolated.

3 Claims, 15 Drawing Sheets

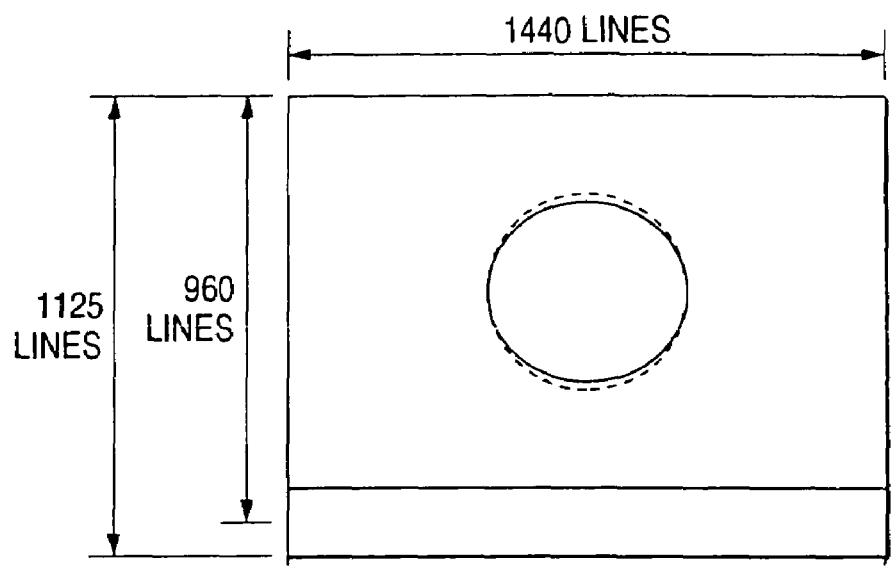
FIG. 5A (V$_{HD2}$)
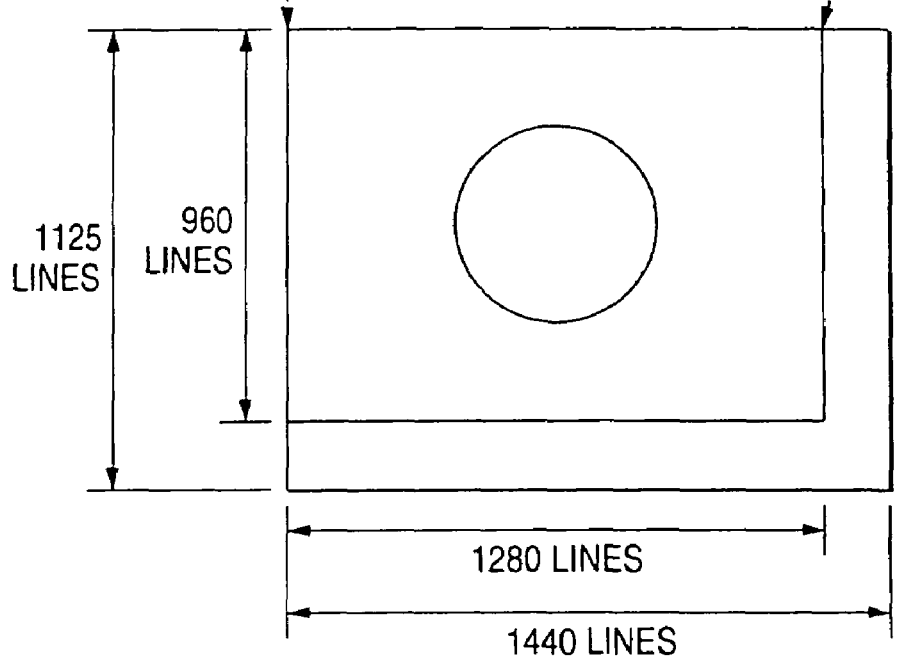
FIG. 5B (V$_{HD3}$)

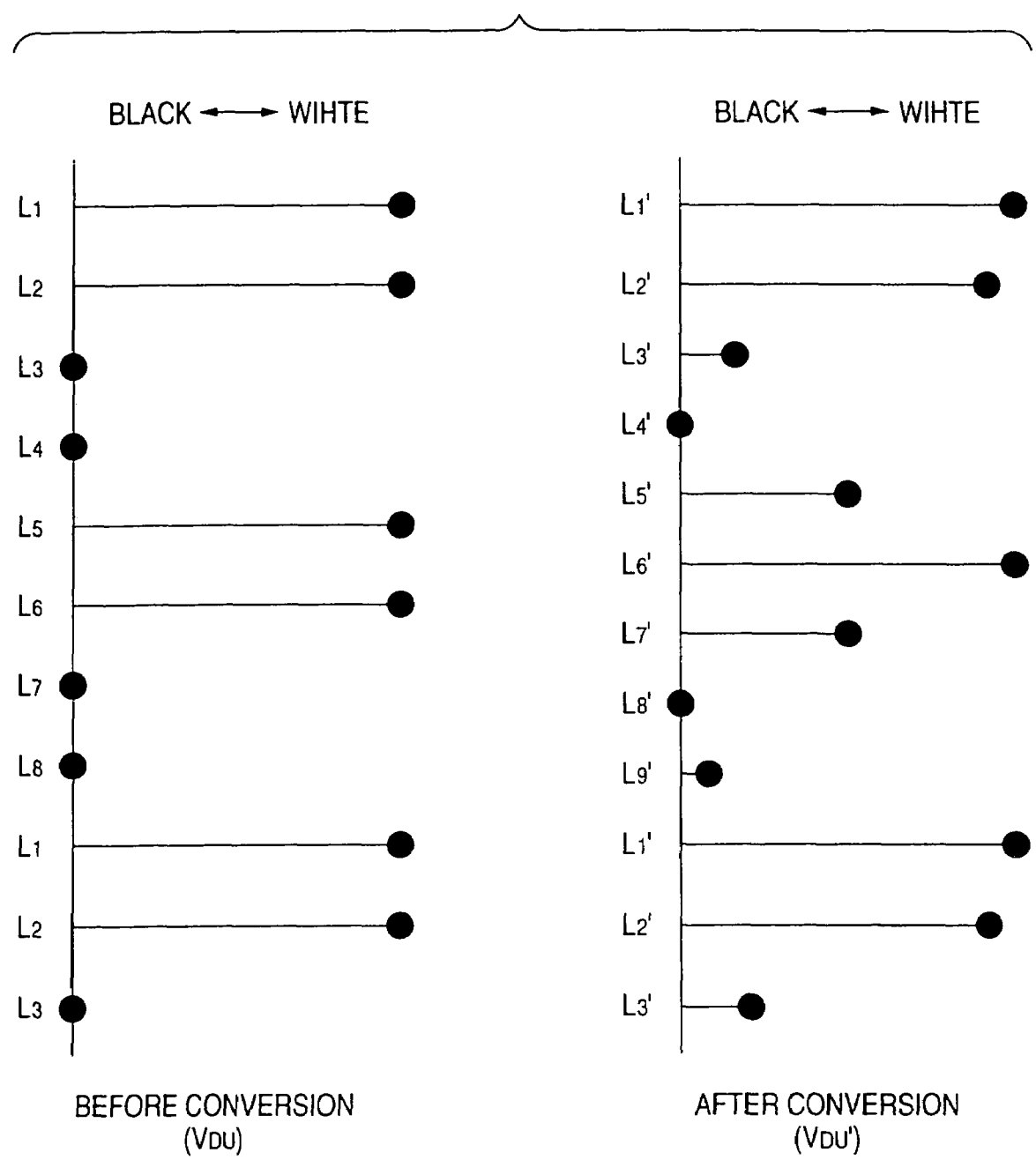

VIDEO SIGNAL PROCESSING CIRCUIT AND METHOD FOR CONVERTING NUMBER OF
SCAN LINES AND IMAGE DISPLAY DEVICE
USING THE SAME

CROSS-REFERENCE TO RELATED APPLICATION

This application is a continuation application of Application Ser. No. 10/170,036 filed Jun. 12, 2002, the disclosure of which is hereby incorporated by reference herein, which claims priority from Japanese Patent Application Nos. 2001-180550 filed on Jun. 14, 2001 in the Japanese Patent Office and 2002-166105 filed on Jun. 6, 2002 in the Japanese Patent Office.

BACKGROUND OF THE INVENTION

1. Field of the Invention

The present invention relates to a video signal processing circuit and a video signal processing method for converting the number of scan lines so that the video signal achieved by subjecting a video signal of an NTSC system to double data rate conversion is converted to a video signal of an HDTV (High Definition TV) system, and an image display device using the same.

2. Description of the Related Art

The NTSC (National Television System Committee) system in which the aspect ration is set to 4:3 and the number of vertical scan lines is equal to 525 (the number of effective scan lines containing video signals is equal to 480) has been known as a television system. Recently, the high definition (EDTV-II: Extended Definition Television) system in which the aspect ratio is set to 16:9 has been also known. In addition, the HDTV (High Definition Television) system in which the aspect ratio is set to 16:9 and the number of vertical scan lines is equal to 1125 (the number of the effective scan lines is equal to 1080) has been known as a television system.

For example, when a video signal of the EDTV-II system is subjected to double data rate conversion by using a line doubler, the number of vertical scan lines of the video signal after the conversion (hereinafter referred to as "double-rate signal") is equal to 1050 (the number of the effective scan lines thereof is equal to 960).

This double-rate signal is different in horizontal frequency from the video signal of the HDTV system (hereinafter referred to as "HDTV signal"). Therefore, when an image based on a double-rate signal is displayed on a display device such as a cathode ray tube which is scanned at the horizontal frequency corresponding to the HDTV signal, the number of scan lines of the double-rate signal is converted to nine eighth (9/8 time) so that the horizontal frequency of the double-rate signal approaches to that of the HDTV system.

Therefore, the horizontal frequency of the double-rate signal is equal to 31.5 kHz (=30 Hz×1050) because the frame frequency is equal to 30 Hz and the number of vertical scan lines is equal to 1050. On the other hand, the frame frequency of the HDTV signal is equal to 30 Hz and the number of vertical scan lines of the HDTV signal is equal to 1125, so that the horizontal frequency of the HDTV signal is equal to 33.75 kHz(=30 Hz×1125). The conversion of the number of scan lines (hereinafter referred to as "scan line number conversion") is generally carried out on the basis of a linear interpolation calculation although the interpolation is carried out by using an interpolating filter which approximates to the interpolation function of sin(x)/x in some cases when much attention is paid to the image quality.

FIG. 13 shows the construction of a scan line interpolating circuit 200 for performing such a linear interpolation calculation.

The scan line interpolating circuit 200 has an input terminal 201 to which a double-rate signal VDU is input, and a delay circuit 202 for delaying the double-rate scan line signal VDU input to the input terminal 201 by only one horizontal period (1H). Here, it is assumed that the double-rate signal VDU input to the input terminal 201 has been read out, for example from a buffer memory (not shown), on the basis of signals achieved by multiplying the vertical, horizontal synchronous pulses of the HDTV signals.

The scan line interpolating circuit 200 further has multipliers 203a to 203h for multiplying the double-rate signal VDU input to the input terminal 201 by coefficients of 0.89, 0.78, 0.67, 0.56, 0.44, 0.33, 0.22 and 0.11 respectively, multipliers 204a to 204h for multiplying the double-rate signal VDU delayed in the delay circuit 202 by only one horizontal period by coefficients of 0.11 0.22, 0.33, 0.44, 0.56, 0.67, 0.78 and 0.89 respectively, and adders 205a to 205h for adding the output signals of the multipliers 203a to 203h with the output signals of the multipliers 204a to 204h respectively.

Further, the scan line interpolating circuit 200 has a nonary counter 206 for repetitively counting the numerals from "0" to "8", a change-over switch 207 to which the count output of the counter 206 is supplied as a switching control signal, and an output terminal 208 for outputting a signal achieved at the movable terminal of the change-over switch 207 as an output video signal VDU'.

The fixed terminal at the side a (hereinafter referred to as "fixed terminal a") of the change-over switch 207 is connected to the input terminal 201, and the fixed terminals of the sides b to i (hereinafter referred to as "fixed terminals b to i" respectively) are connected to the output sides of the adders 205a to 205h respectively.

A horizontal synchronous pulse Ph of the HDTV signal is supplied as a count clock to the counter 206. The movable terminal of the change-over switch 207 is connected to each of the fixed terminals a to i respectively when the count output of the counter 206 varies from "0" to "8" respectively.

Next, the operation of the scan line interpolating circuit 200 will be described.

During the horizontal period for which the count output of the counter 206 is equal to "0", the movable terminal of the change-over switch 207 is connected to the fixed terminal a, a signal L1 of the first scan line of the double-rate signal VDU is input to the input terminal 201 and the signal L1 of the first scan line is directly passed through the side a of the change-over switch 207 and output as a signal L1' of the first scan line of the output video signal VDU'0 to the output terminal 208.

During the horizontal period for which the count output of the counter 206 is equal to "1", the movable terminal of the change-over switch 207 is connected to the fixed terminal b, a signal L2 of the second scan line of the double-rate signal VDU is input to the input terminal 201 and the signal L2 of the second scan line is multiplied by 0.89 in the multiplier 203a. At the same time, the signal L1 of the first scan line of the double-rate signal VDU is output from the delay circuit 202, and multiplied by 0.11 in the multiplier 204a. Thereafter, the output signals of the multipliers 203a and 204a are added with each other in the adder 205a, and the addition signal (0.89L2+0.11L1) is passed through the side b of the change-over switch 207, and output as a signal L2' of the second scan line of the output video signal VDU' to the output terminal 208.

The same operation is carried out when the count output of the counter 206 is equal to "2" to "8", whereby the signals of nine scan lines of the output video signal VDU' are created from the signals of eight scan lines of the double-rate signal VDU.

FIG. 14 shows the interpolation of the scan lines in the respective cases where the count output is equal to "0" to "8" as described above.

When the conversion of the scan line number is performed by the linear interpolation as described above, degradation of image quality occurs. The degradation of the image quality will be described with reference to FIG. 15.

FIG. 15 shows the state of the signal level of each scan line of the output video signal VDU' in the case where the signal level of the scan lines of the double-rate signal VDU alternately repeats each of the white level and the black level by every two scan lines.

In this case, a white portion corresponding to two scan lines of the double-rate signal VDU is expanded to a portion corresponding to three or four scan lines in the output video signal VDU'. In the double-rate signal VDU, the two scan lines in the white portion have the same brightness. However, in the output video signal VDU', two bright scan lines are different in brightness from each other, or only one scan line is bright.

The degradation of the scan line image quality as described above is not caused by the conversion manner, and it can be prevented by limiting the band of the input signal. However, if the scan line signal is subjected to the band limiting, an image would be blurred, so that the band limiting cannot be actually adopted. Therefore, when the conversion of the scan line number is carried out by the linear interpolation, the degradation of the image quality is unavoidable.

SUMMARY OF THE INVENTION

Therefore, an object of the present invention is to provide a video signal processing circuit and a video signal processing method by which a video signal having no degradation can be achieved when a video signal of a first system is achieved from a video signal of a second system.

Further, another object of the present invention is to provide an image display device which can prevent degradation of image quality when a video signal of a first system is achieved from a video signal of a second system so that an image having higher image quality can be displayed on the basis of the video signal of the first system as compared with the video signal of the second system.

In order to attain the above objects, according to the present invention, a video signal processing circuit in which a video signal of a first system having a first number of vertical scan lines is converted to a video signal of a second system having a second number of vertical scan lines is characterized by comprising a scan line number converting portion for increasing or reducing only the number of scan lines of a pedestal level signal constituting the video signal of the first system to achieve the video signal of the second system from the video signal based on the first sysytem.

Further, in order to attain the above objects, a video signal processing method according to the present invention is characterized in that when a video signal of a first system having a first number of vertical scan lines is converted to a video signal of a second system having a second number of vertical scan lines, only the number of scan lines of a pedestal level signal constituting the video signal of the first system is increased or reduced.

In the video signal processing circuit, the scan line number converting portion may include a frame memory, a writing control portion for writing an effective scan line portion of the video signal of the first system into the frame memory every frame in synchronism with vertical and horizontal synchronous signals corresponding to the video signal of the first system, and a reading control portion for reading an effective scan line portion of the video signal of the first system from the frame memory every frame in synchronism with the vertical and horizontal synchronous signals corresponding to the video signal of the second system, and reading the pedestal level signal from the memory in synchronism with the vertical and horizontal synchronous signals corresponding to the video signal of the second system, thereby achieving the video signal of the second system.

According to the present invention, only the number of scan lines of the pedestal level signal constituting the video signal of the first system is increased or reduced to thereby achieve the video signal of the second system having a second number of vertical scan lines. In this case, the effective scan line portion of the video signal of the first system directly constitutes the video signal of the second system. Therefore, the image based on the video signal of the second system thus achieved suffers no degradation unlike the case where the scan line number is converted by the linear interpolation as described above.

In the case where only the scan line number of the pedestal level signal constituting the video signal of the first system is increased or reduced to thereby achieve the video signal of the second system having the second number of vertical scan lines, when the image based on the video signal of the second system is displayed on an image display device such as a cathode-ray tube (CRT), or a liquid crystal display (LCD), contraction or expansion occurs in the vertical direction of the image.

Such an image distortion can be solved as follows. That is, each scan line number of the video signal of the second system which is achieved in the scan line number converting portion is reduced or increased in accordance with the ratio of the effective scan line number of the video signal of the first system to the effective scan line number of the video signal of the second system to thereby achieve another video signal of the second system in which each of the pixel signals of each scan line concerned is set as a part of each of the pixel signals of each scan line or a part of each of the pixel signals of each scan line concerned is set as each of the pixel signals of each scan line.

Further, according to the present invention, an image display device is characterized by comprising: a first input portion for receiving a video signal of a first system having a first number of vertical scan lines; a scan line converting portion for increasing or reducing only the scan line number of a pedestal level signal constituting the video signal of the first system input to the first input portion to achieve a first video signal of a second system having a second number of vertical scan lines from the video signal of the first system; a second input portion to which a second video signal of the second system having the second number of vertical scan lines is input; a signal selecting portion for selectively outputting the first video signal of the second system achieved in the scan line converting portion or the second video signal of the second system input to the second input portion; a display portion which is supplied with the video signal of the second system output from the signal selecting portion and displays the image based on the video signal thus supplied; and deflecting control means for changing the vertical deflection width of the display portion in accordance with the ratio of the effective scan line number of the second system to the effective scan line number of the first system when the first video signal of the second system is selected in the signal selecting portion.

In the present invention, the first video signal of the second system achieved in the scan line converting portion or the second video signal of the second system input to the second input portion is selectively supplied to the display portion. In the scan line converting portion, only the scan line number of the pedestal level signal constituting the video signal of the first system is increased or reduced to achieve the first video signal of the second system having the second number of vertical scan lines.

If it is assumed that when the display portion is supplied with the second video signal of the second system which is not achieved in the scan line converting portion, the image of the second video signal is displayed on the display portion concerned with no image distortion, and when the first video signal of the second system achieved in the scan line converting portion is displayed on the display portion, the image based on the first video signal displayed on the display portion concerned is contracted or expanded in the vertical direction.

However, when the first video signal of the second system achieved in the scan line converting portion is supplied to the display portion, the vertical deflection width of the display portion is changed in accordance with the ratio of the effective scan line number based on the second system to the effective scan line number based on the first system, whereby the contraction or expansion in the vertical direction of the image based on the first video signal can be corrected.

Further, according to the present invention, a video signal processing circuit in which a video signal of a first system having a first number of vertical scan lines is converted to a video signal of a second system having a second number of vertical scan lines, is characterized by comprising: scan line number converting means for increasing or reducing only the scan line number of a pedestal level signal constituting the video signal of the first system to achieve a first video signal of a second system from the video signal of the first system; scan line interpolating means for increasing or reducing the scan line number of the video signal of the first system by interpolation to achieve a second video signal of the second system from the video signal of the first system; and signal selecting means for selectively outputting the first video signal of the second system achieved by the scan line number converting means or the second video signal of the second system achieved by the scan line interpolating means.

According to the present invention, in the scan line number converting means, the scan line number of the pedestal level signal constituting the video signal of the first system is increased or reduced to achieve the first video signal of the second system having the second number of vertical scan lines. Since the effective scan line portion of the video signal of the first system is directly contained in the first video signal, the image based on the first video signal never has such degradation as occurs in the case where the scan line number conversion is carried out by using the linear interpolation. However, when the image based on the first video signal is displayed on an image display device such as a cathode ray tube, or a liquid crystal device, contraction or expansion occurs in the vertical direction of the image.

Further, in the scan line number interpolating means, the scan line number of the video signal of the first system is increased or reduced by the interpolation to achieve the second video signal of the second system having the second number of vertical scan lines. Neither contraction nor expansion occurs in the vertical direction of the image based on the second video signal. However, the effective scan line portion of the video signal of the first system is not directly contained in the second video signal, and thus the image based on the second video signal is degraded. Accordingly, in the present invention, when an image having high image quality is achieved, the first video signal can be selectively used. On the other hand, when there is no correcting means for image distortion and an image having no image distortion is achieved, the second video signal can be selectively used. Therefore, the present invention is more convenient for users.

BRIEF DESCRIPTION OF THE DRAWINGS

FIG. 5 is a diagram showing the association relationship in pixel between the HDTV signal VHD2 and an HDTV signal VHD3;

FIG. 15 is a diagram showing the signal level before and after conversion.

DETAILED DESCRIPTION OF THE PREFERRED EMBODIMENTS

Preferred embodiments according to the present invention will be described with reference to the accompanying drawings hereinafter.

Figure 1:
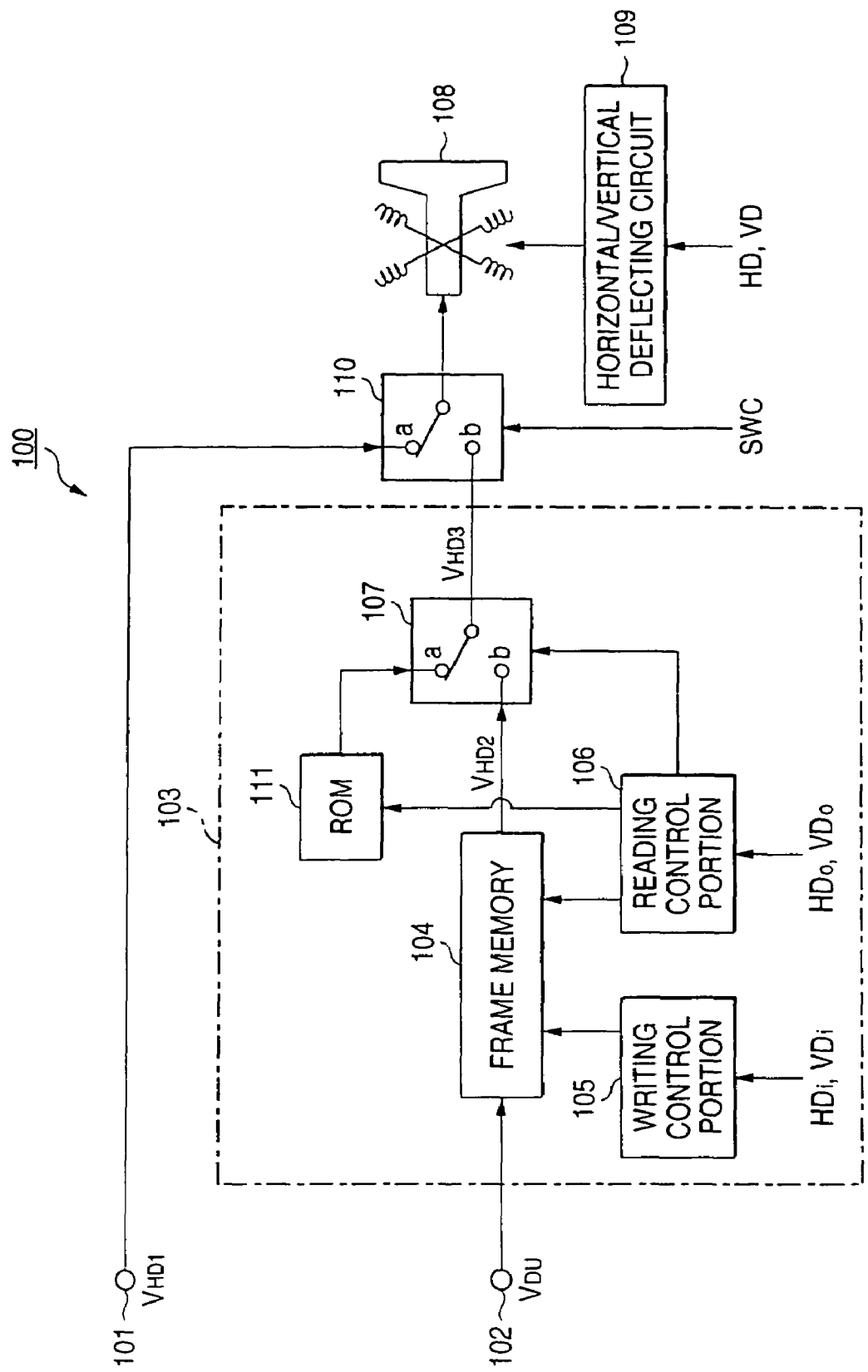
FIG. 1 is a block diagram showing the construction of an image display device according to a first embodiment of the present invention.

FIG. 1 shows the construction of an image display device 100 according to a first embodiment of the present invention.

The image display device 100 has an input terminal 101 to which an HDTV signal VHD1 is input, and an input terminal 102 to which a double-rate signal VDU is input. Here, the vertical scan line number (the number of vertical scan lines) of the HDTV signal is equal to 1125 (the effective scan line number is equal to 1080). The double-rate signal VDU is achieved by subjecting a video signal of EDTV-II system to double-rate conversion, and the vertical scan line number (the number of vertical scan lines) of the double-rate signal is equal to 1050 (the effective scan line number is equal to 960).

The image display device 100 has a scan line number converting portion 103 for achieving an HDTV signal VHD3 from the double-rate signal VDU input to the input terminal 102.

The scan line number converting portion 103 comprises a frame memory 104, a writing control portion 105, a reading control portion 106, a change-over switch 107 and ROM 111. The writing control portion 105 writes the portion of the 960 effective scan lines of the double-rate signal VDU into the frame memory 104 every frame in synchronism with the signals VDi, HDi achieved by multiplying the vertical and horizontal synchronous signals of the double-rate signal VDU respectively.

The reading control portion 106 reads out the portion of the 960 effective scan lines of the double-rate signal VDU thus written in the frame memory 104 every frame in synchronism with the vertical and horizontal reference signals VDo and HDo, respectively.

The reading control portion 106 subsequently reads out a pedestal level signal written in ROM 111. The pedestal level signal is supplied to the fixed terminal a of the change-over switch 107, and the HDTV signal VHD2 read out from the frame memory 104 is supplied to the fixed terminal b. The switching operation of the change-over switch 107 is controlled on the basis of a switching control signal supplied from the reading control portion 106 so that the HDTV signal VHD2 is selected during the period for which the effective scan line portion of the video signal is read out from the frame memory 104 and the pedestal level signal is selected when the reading operation is finished.

Since the level of the pedestal level signal is unvaried, it may be pre-stored in a mask ROM or a non-volatile memory as ROM 111, and reference power my be supplied while subjected to D/A conversion. The pedestal level signal is added by the change-over switch 107 to achieve HDTV signal VHD3 whose vertical scan line number is equal to 1125.

Figure 2:
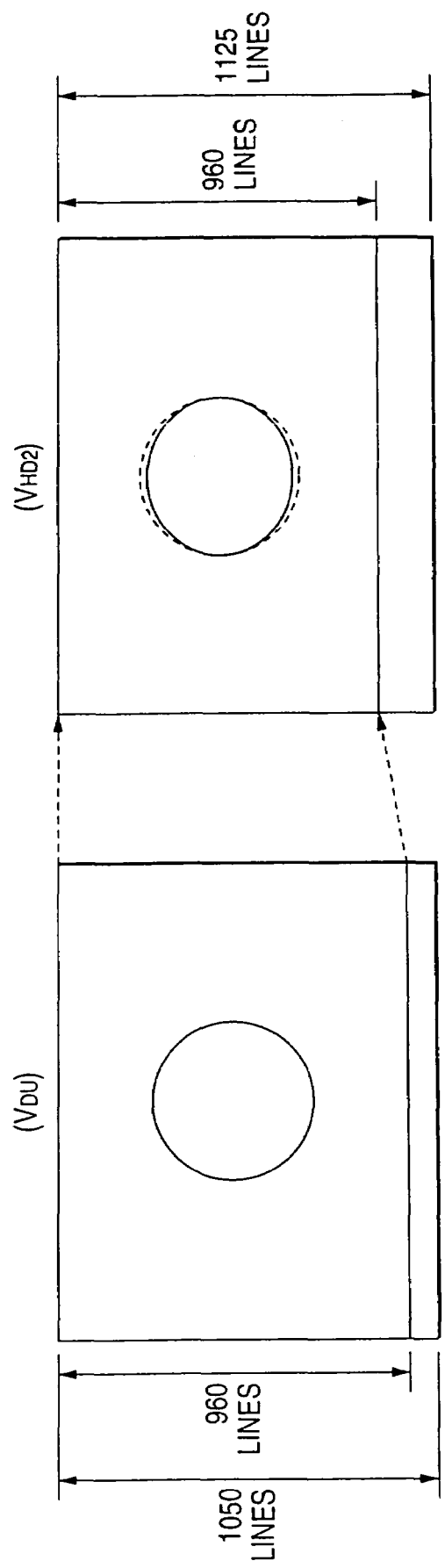
FIG. 2 is a diagram showing the association relationship in scan line between a double-rate signal VDU and an HDTV signal VHD2.

FIGS. 2A and 2B show the association relationship in scan line between the double-rate signal VDU and the HDTV signal VHD3.

The image display device 100 has a change-over switch 110 for selectively outputting the HDTV signal VHD1 input to the input terminal 101 or the HDTV signal VHD3 achieved from the change-over switch 107. The HDTV signal VHD1 is supplied to the fixed terminal a of the change-over switch 110, and the HDTV signal VHD3 is supplied to the fixed terminal b. The switching operation of the change-over switch 110 is carried out on the basis of the switching control signal SWC supplied from the external.

The image display device 100 has a cathode ray tube 108 to which the HDTV signal output from the change-over switch 110 is supplied to display the image based on the HDTV signal, and a horizontal/vertical deflecting circuit 109 for supplying deflecting current to the horizontal and vertical deflecting coils of the cathode ray tube 108. Here, the horizontal and vertical deflecting circuit 109 is operated on the basis of vertical and horizontal drive signals VD and HD (horizontal synchronous frequency of 33.75 kHz, vertical synchronous frequency of 59.94 Hz) achieved by frequency-dividing the vertical and horizontal reference signals VDo, HDo.

When the change-over switch 110 is switched to the side a by the switch control signal SWC, the HDTV signal VHD1 input to the input terminal 101 is supplied through the side a of the change-over switch 110 to the cathode ray tube 108. Accordingly, the image based on the HDTV signal VHD1 is displayed on the cathode ray tube 108.

In this embodiment, the cathode ray tube 108 is used as the image display device. However, there may be employed a configuration that a flat panel display such as a liquid crystal display device, or other image display devices can be arbitrarily connected to the output side of the change-over switch 110, in place of the cathode ray tube.

On the other hand, when the change-over switch 110 is switched to the side b by the switch control signal SWC, the HDTV signal VHD3 achieved from the change-over switch 107 is supplied through the side b of the change-over switch 110 to the cathode ray tube 108. Accordingly, the image based on the HDTV signal VHD3 is displayed on the cathode ray tube 108.

As described above, in the image display device 100 shown in FIG. 1, the pedestal level signal is added by the change-over switch 107, thereby achieving the HDTV signal VHD3 whose vertical scan line number is equal to 1125. The HDTV signal VHD3 directly contains the portion of the 960 effective scan lines of the HDTV signal VHD2. Accordingly, the image to be displayed on the cathode ray tube 108 on the basis of the HDTV signal VHD3 never has such degradation as occurs when the scan line number is converted by the linear interpolation, and thus the image quality is kept high.

In the image display device 100 of FIG. 1 described above, when the change-over switch 110 is switched to the side b, the HDTV signal VHD3 achieved in the scan line number converting portion 103 is supplied to the cathode ray tube 108, and the image based on the HDTV signal VHD3 is displayed on the cathode ray tube 108. In this case, since the frequency of the reference signal HDo for reading is set to a higher value as compared with the multiplied signal HDi for writing, the reading operation is carried out in a shorter time as compared with the writing operation. Therefore, as indicated by a solid line at the center of FIG. 2B, contraction occurs in the vertical direction of the image. For comparison, the broken line at the center of FIG. 2B shows a state where no contraction occurs in the vertical direction of the image.

Next, a second embodiment according to the present invention will be described.

Figure 3:
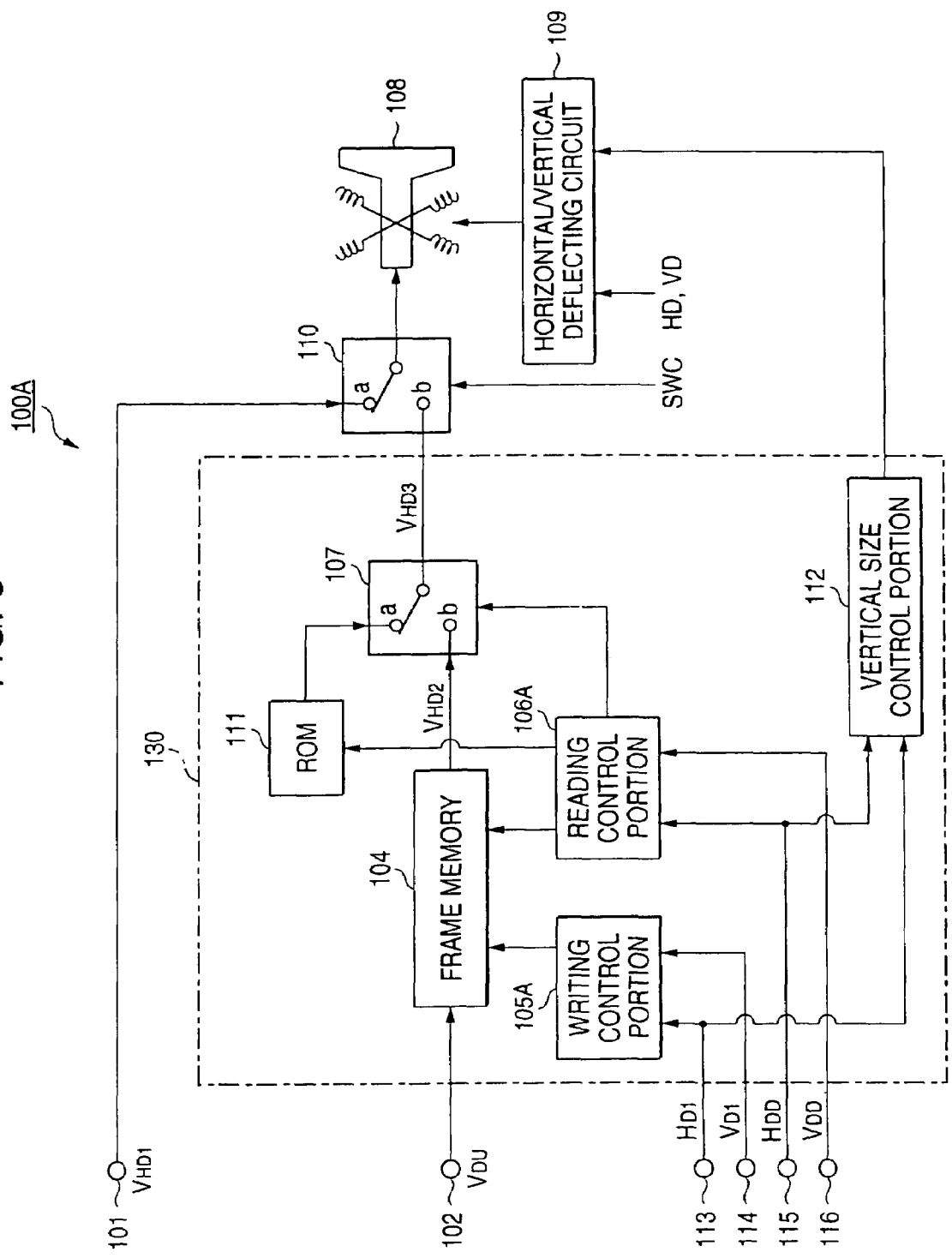
FIG. 3 is a block diagram showing the construction of an image display device according to a second embodiment of the present invention.

FIG. 3 shows the construction of an image display device 100A according to the second embodiment of the present invention. The image display device 100A is designed so that the contraction in the vertical direction of the image as described above is prevented. In FIG. 3, the corresponding portions to those of FIG. 1 are represented by the same reference numerals, and the detailed description thereof is omitted.

The image display device 100A has a scan line number converting portion 130 for achieving an HDTV signal VHD3 from a double-rate signal VDU input to the input terminal 102.

The scan line number converting portion 130 is equipped with a writing control portion 105A for writing the portion of 960 effective scan lines of the double-rate signal VDU into the frame memory 104 every frame, a reading control portion 106A for reading out the portion of 960 effective scan lines of the double-rate signal VDU thus written in the frame memory 104 in conformity with the 960 scan lines corresponding to the effective scan line portion out of the 1125 vertical scan lines of the HDTV signal VHD2, and a vertical size control portion 112 for controlling the vertical size.

In the vertical size control portion 112, the horizontal/vertical deflecting circuit 109 is controlled on the basis of the ratio of the frequencies of the reference signal HDo for reading and the multiplied signal HDi for writing so that the vertical deflection width is increased.

In the image display device 100A, when the change-over switch 110 is switched to the side b, the HDTV signal VHD3 achieved by the change-over switch 107 is supplied to the cathode ray tube 108 and the image based on the HDTV signal VHD3 is displayed on the cathode ray tube 108, the horizontal/vertical deflecting circuit 109 is controlled to increase the vertical deflection width. Accordingly, the contraction of the image in the vertical direction is corrected.

As described above, according to the image display device 100A shown in FIG. 3, an image having high image quality and suffering no degradation can be achieved as in the case of the image display device 100 shown in FIG. 1, and in addition, when the image based on the HDTV signal VHD3 achieved by the change-over switch 107 is displayed on the cathode ray tube 108, the contraction of the image in the vertical direction can be excellently prevented.

Next, a third embodiment according to the present invention will be described.

Figure 4:
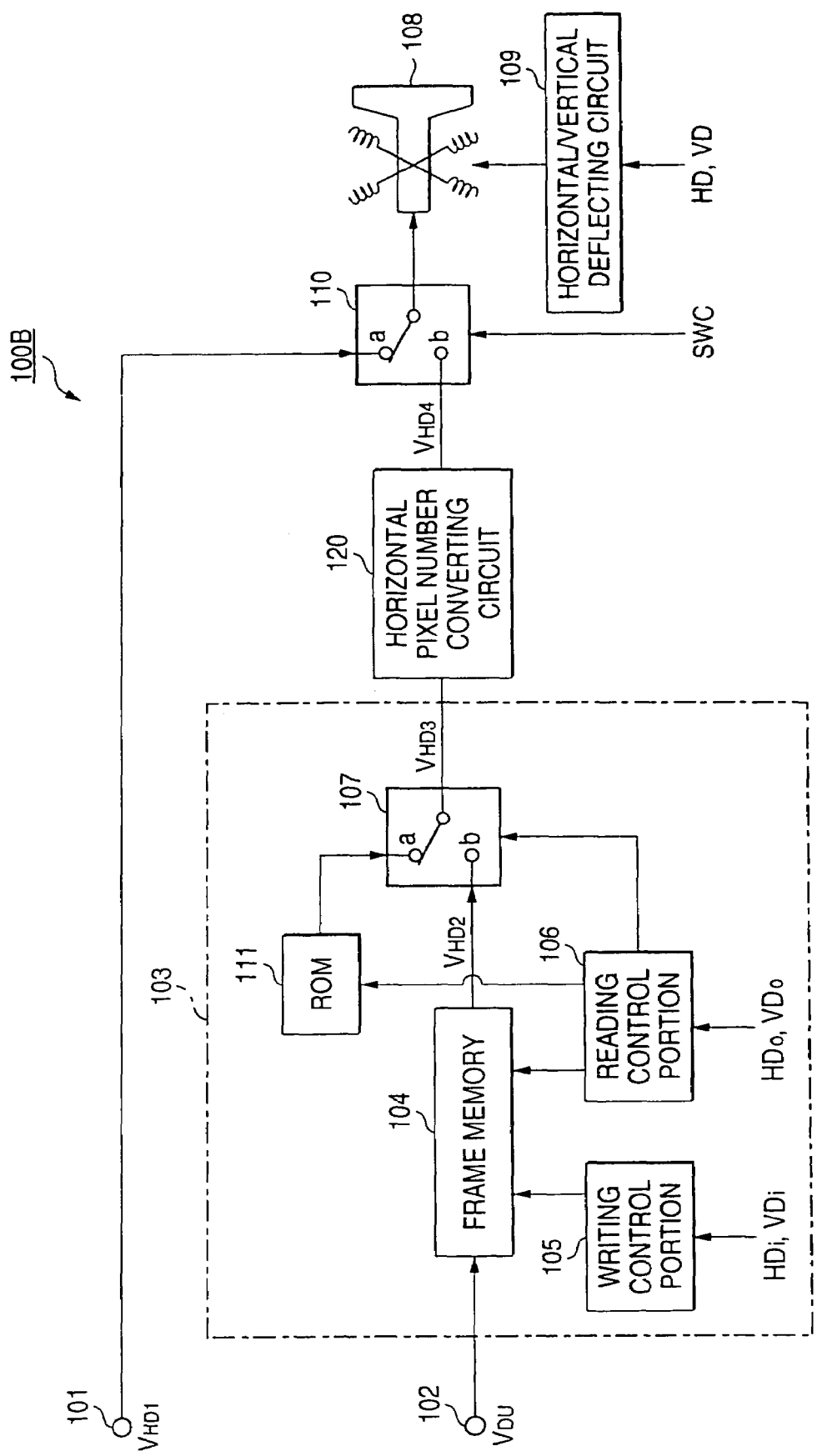
FIG. 4 is a block diagram showing the construction of an image display device according to a third embodiment of the present invention.

FIG. 4 shows the construction of an image display device 100B according to a third embodiment of the present invention. In FIG. 4, the corresponding portions to those of FIG. 1 are represented by the same reference numerals, and the detailed description thereof is omitted.

The image display device 100B shown in FIG. 4 has an effect of preventing occurrence of contraction in the vertical direction of the image based on the HDTV signal VHD2 achieved by the scan line number converting portion 103 as in the case of the image display device 100A shown in FIG. 3.

The image display device 100B has a horizontal pixel number converting circuit 120 for reducing the number of pixel signals of each scan line constituting the HDTV signal VHD3 output from the scan line number converting portion 103 and achieving an HDTV signal VHD4 in which each of the pixel signals of each scan line concerned is set as a part of each of the pixel signals of each scan line.

Here, the number of the pixel signals of each scan line constituting the HDTV signal VHD4 is changed in accordance with the ratio of the effective scan line number (960 lines) of the double-rate signal to the effective scan line number (1050 lines) of the HDTV signal. For example, when the number of pixel signals of each scan line of the HDTV signal VHD4 is equal to 1440 as shown in FIG. 5A, this number is reduced to 12800 (this value corresponds to (960/1050)×1440, and each of the pixel signals of each scan line of the HDTV signal VHD3 is set as a part of each of the pixel signals of the HDTV signal VHD4 as shown in FIG. 5B.

Figure 6:
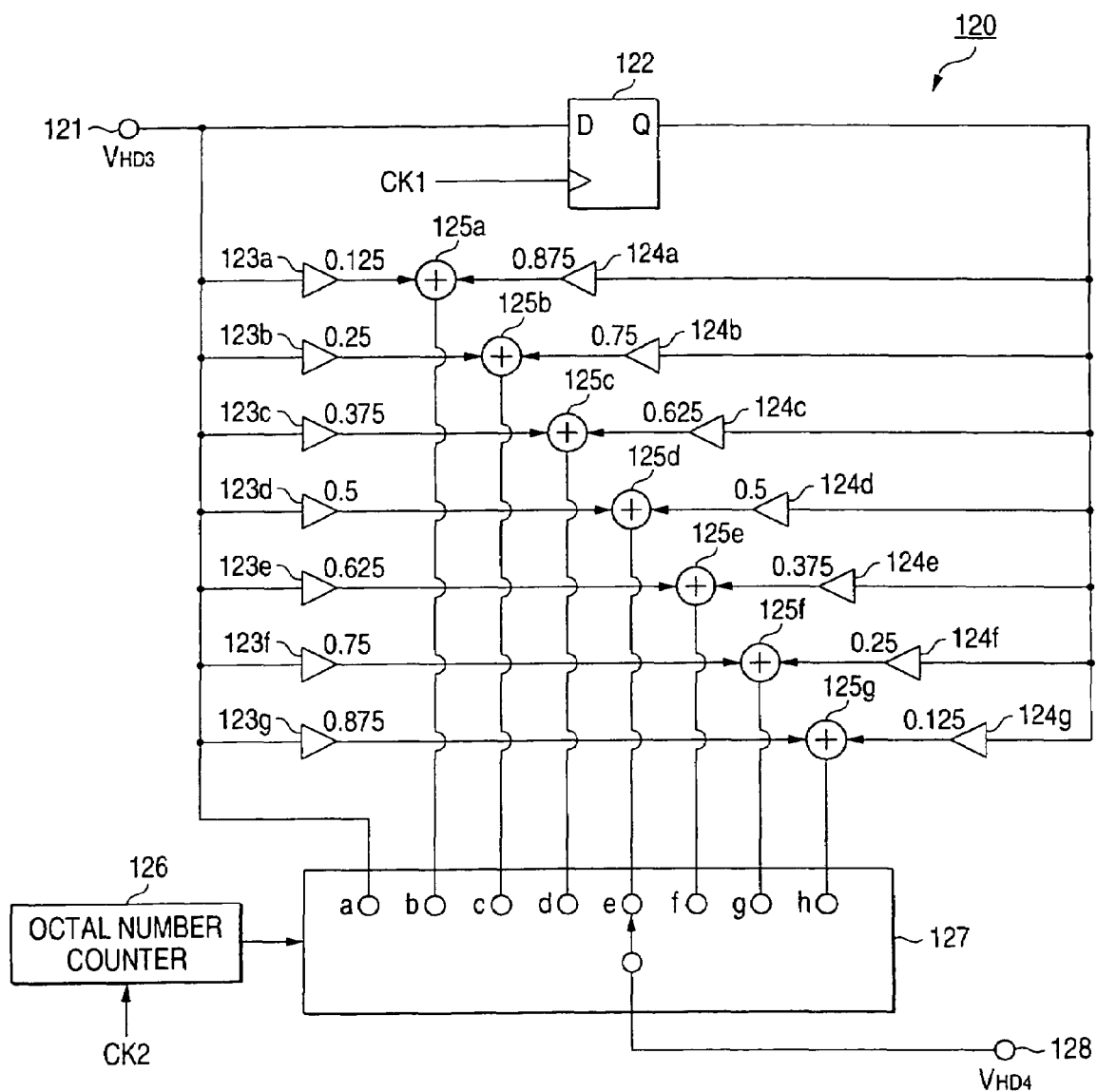
FIG. 6 is a block diagram showing the construction of a pixel number converting portion constituting a horizontal pixel number converting circuit.

FIG. 6 shows the construction of the horizontal pixel number converting portion 120 for converting the number of pixel signals of each scan line of the HDTV signal VHD3 from 1440 to 1280 as described above.

The horizontal pixel number converting portion 120 has an input terminal 121 to which the pixel signals of each scan line of the HDTV signal VHD3 is input, and a D flip-flop 122 functioning as a delay circuit for delaying the pixel signals of each scan line of the HDTV signal VHD3 input to the input terminal 121 by only one clock period. Here, it is assumed that the pixel signals of each scan line of the HDTV signal input to the input terminal 121 are read out, for example, from a buffer memory (not shown) on the basis of a clock signal CK1 having a first frequency. The pixel signals of each scan line of the HDTV signal VHD3 are supplied to the data input terminal D of the D flip-flop 122. Further, the clock signal CK1 is supplied to the clock terminal of the D flip-flop 122., whereby the pixel signals of each scan line of the HDTV signal VHD3 input to the input terminal 121 are output to the output terminal Q of the D flip-flop 122 with being delayed by one clock period.

The horizontal pixel number converting portion 120 has multipliers 123a to 123g for multiplying each of the pixel signals of each scan line of the HDTV signal VHD3 input to the input terminal 201 by coefficients of 0.125, 0.25, 0.375, 0.5, 0.625, 0.75, 0.875 respectively, multipliers 124a to 124g for multiplying each of the pixel signals of each scan line of the HDTV signal VHD2 delayed by one clock period in the D flip-flop 122 by coefficients of 0.875, 0.75, 0.625, 0.5, 0.375, 0.25, 0.125 respectively, and adders 125a to 125g for adding the output signals of the multipliers 123a to 123g and the output signals of the multipliers 124a to 124g.

The horizontal pixel number converting portion 120 has an octal counter 126 for repeating the count from "0" to "7", a change-over switch 127 which is supplied with the count output of the counter 126 as a switching control signal, and an output terminal 128 for outputting the signal achieved at the movable terminal of the change-over switch 127 as an output video signal VHD4.

The fixed terminal at the side a (hereinafter referred to as "fixed terminal a") of the change-over switch 127 is connected to the input terminal 121, and the fixed terminals at the side b to side h (hereinafter referred to as "fixed terminals b to h") are connected to the output sides of the adders 125a to 125g.

A clock signal CK2 having a second frequency (which is eight-ninth (8/9) time as high as the first frequency) is supplied to the counter 126 as a count clock. The movable terminal of the change-over switch 127 is connected to each of the fixed terminals a to h when the count output of the counter 126 varies from "0" to "7" respectively.

Next, the operation of the horizontal pixel number converting portion 120 will be described.

During a clock period for which the count output of the counter 126 is equal to "0", the movable terminal of the change-over switch 127 is connected to the fixed terminal a, a first pixel signal D1 of a scan line of the HDTV signal VHD3 is input to the input terminal 121, and this first pixel signal D1 is directly output as a first pixel signal D1' of a scan line of the output video signal VHD4 through the side a of the change-over switch 127 to the output terminal 128.

During a clock period for which the count output of the counter 126 is equal to "1", the movable terminal of the change-over switch 127 is connected to the fixed terminal b, a third pixel signal D3 of a scan line of the HDTV signal VHD3 is input to the input terminal 201, and the third pixel signal D3 is multiplied by 0.125 in the multiplier 123a. At the same time, a second pixel signal D2 of the HDTV signal VHD2 is output from the D flip-flop 122, and the second pixel signal D2 thus output is multiplied by 0.875 in the multiplier 124a. The output signals of the multipliers 123a, 124a are added to each other in the adder 125a, and the addition signal (0.125D3+0.875D2) is passed through the side b of the change-over switch 127 and output as a second pixel signal D2' of a scan line of the output video signal VHD4 to the output terminal 128.

During a clock period for which the counter output of the counter 126 is equal to "2", the movable terminal of the change-over switch 127 is connected to the fixed terminal c, a fourth pixel signal D4 of a scan line of the HDTV signal VHD3 is input to the input terminal 201 and the fourth pixel signal D4 thus input is multiplied by 0.25 in the multiplier 123b. At the same time, the third pixel signal D3 of the HDTV signal VHD2 is output from the D flip-flop 122, and multiplied by 0.75 in the multiplier 124b. The output signals of the multipliers 123b, 124b are added with each other in the adder 125b, and the addition signal (0.25D4+0.75D3) is output as a third pixel signal D3' of a scan line of the output video signal VHD4 through the side c of the change-over switch 127 to the output terminal 128.

During a period for which the count output of the counter 126 is equal to "3" to "7", the movable terminal of the change-over switch 127 is connected to each of the fixed terminals d to h, each of fifth to ninth pixel signals D5 to D9 of a scan line of the HDTV signal VHD3 is input to the input terminal 121, and fourth to eighth pixel signals D4' to D8' of a scan line of the output video signal VHD2' are output to the output terminal 128 like the above case.

When the counter output of the counter 126 is equal to "0" to "7", the same operation as described above is carried out, whereby the eight pixel signals of each scan line of the output video signal VHD4 are formed from the nine pixel signals of each scan line of the HDTV signal VHD3.

Figure 7:
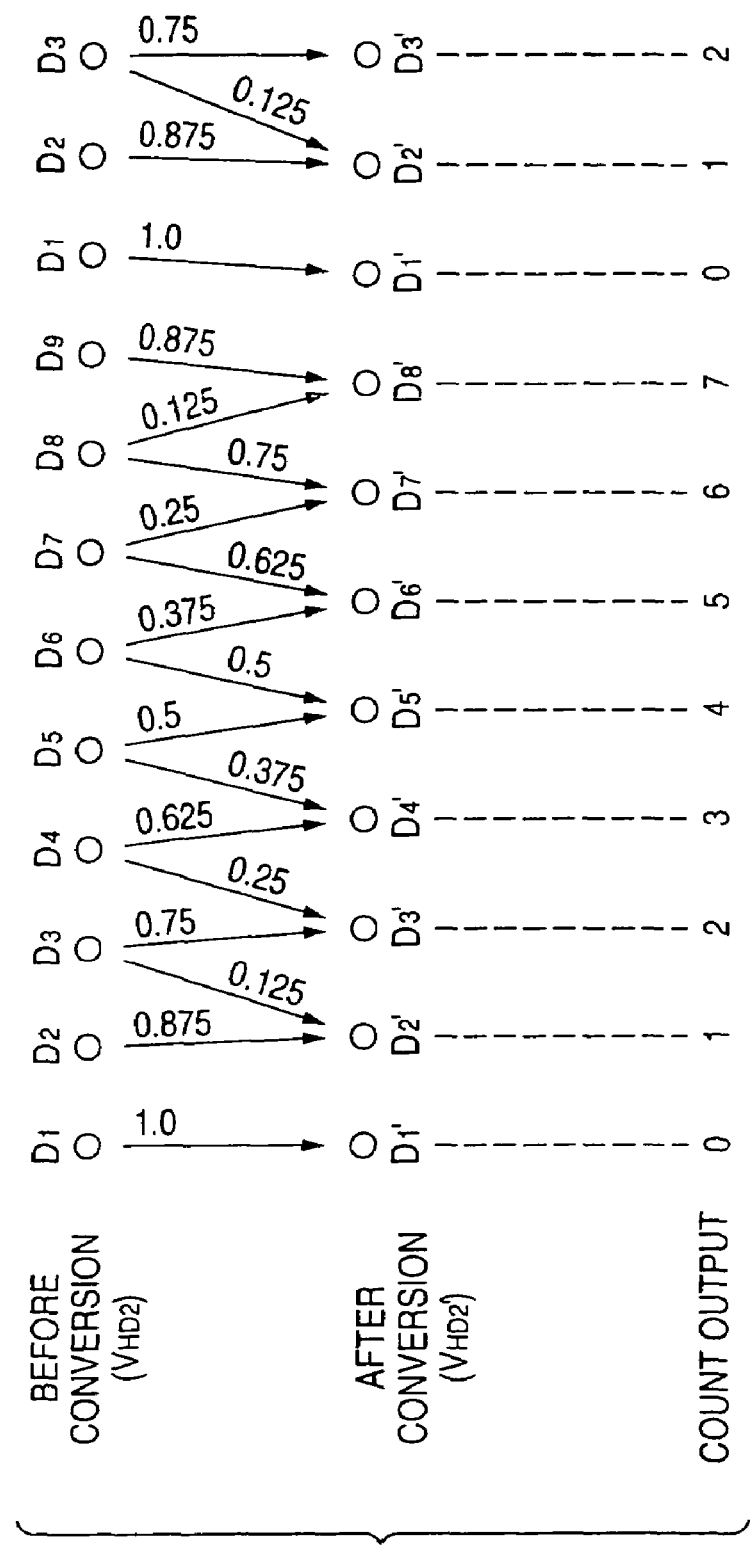
FIG. 7 is a diagram showing the pixel number conversion.

FIG. 7 shows the conversion of the pixel number for the cases where the count output is equal to "0" to "7".

Returning to FIG. 4, the HDTV signal VHD4 achieved in the horizontal pixel number converting circuit 120 as described above is supplied to the fixed terminal b of the change-over switch 110, and the HDTV signal VHD1 is supplied to the fixed terminal a of the change-over switch 110. The switching operation of the change-over switch 110 is carried out on the basis of the switching control signal SWC supplied from the external as in the case of the image display device 100 shown in FIG. 1.

As described above, according to the image display device 100B of FIG. 4, as in the case of the image display device 100 shown in FIG. 1, the pedestal level signal is added to thereby achieve the HDTV signal VHD3 having 1125 vertical scan lines, and further the number of pixel signals of each scan line constituting the HDTV signal VHD3 is reduced by the horizontal pixel number converting portion 120, thereby achieving the HDTV signal VHD4 in which each of the pixel signals of each scan line concerned is set as a part of each of the pixel signals of each scan line.

In the horizontal pixel number conversion, the signal band is limited by a low-pass filter before an analog signal is converted to a digital signal. Accordingly, an image to be displayed on the cathode ray tube 108 on the basis of the HDTV signal VHD4 suffers no such degradation as occurs when the scan line number is converted by using the linear interpolation, and the image quality thereof is high.

As described above, the HDTV signal VHD3 is achieved by adding the pedestal level signal, and thus contraction occurs in the vertical direction of the image based on the HDTV signal VHD3 as shown in FIG. 2B. However, the HDTV signal VHD4 is achieved by reducing the number of pixel signals of each scan line constituting the HDTV signal VHD3 and setting each of the pixel signals of each scan line concerned as a part of each of the pixel signals of each scan line (FIGS. 5A and 5B), so that contraction occurs in the horizontal direction of the image by the reduction processing of the pixel number. Accordingly, the image based on the HDTV signal VHD4 suffers no distortion as a result because the image is contracted in the horizontal direction in accordance with the contraction degree in the vertical direction.

Next, a fourth embodiment of the present invention will be described.

Figure 8:
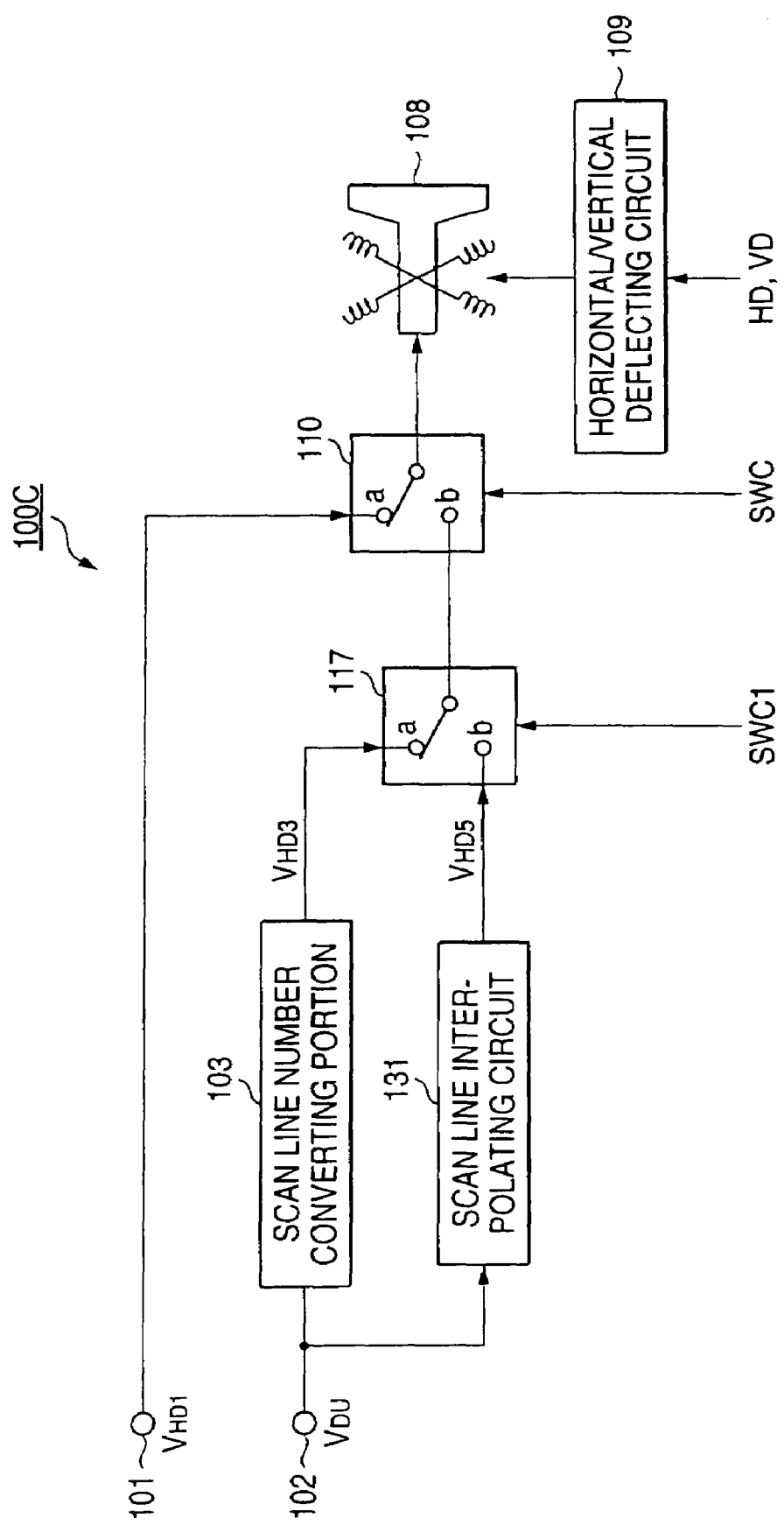
FIG. 8 is a block diagram showing the construction of an image display device according to a fourth embodiment of the present invention.

FIG. 8 shows the construction of an image display device 100C according to the fourth embodiment of the present invention. In FIG. 8, the corresponding portions to those of FIG. 1 are represented by the same reference numerals, and the detailed description thereof is omitted.

Figure 11:
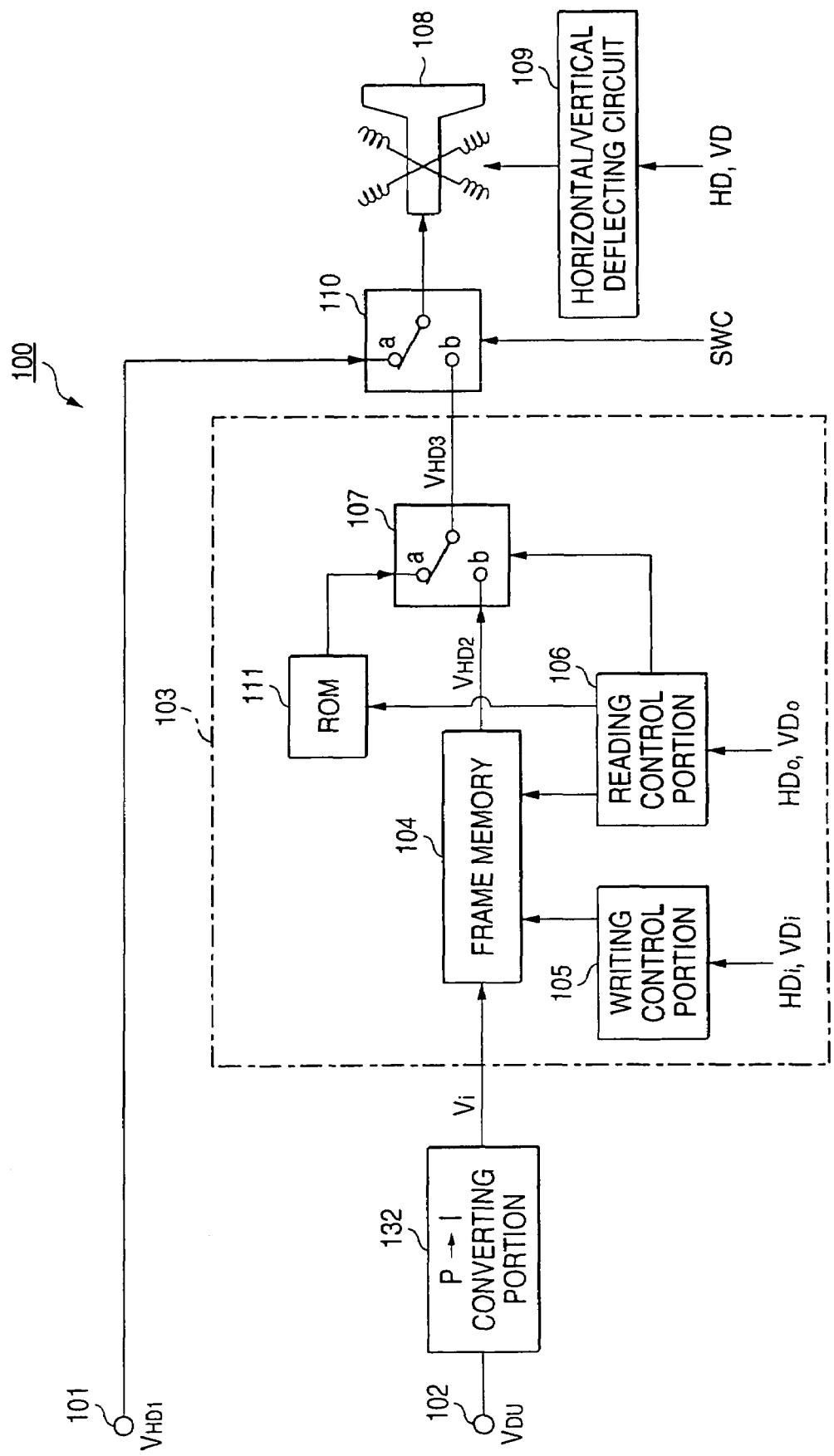
FIG. 11 is a block diagram showing the construction of an image display device according to a seventh embodiment of the present invention.

The image display device 100C shown in FIG. 8 has a scan line interpolating circuit 131 for achieving an HDTV signal VHD 5 from the double-rate signal VDU input to the input terminal 102. The scan line interpolating circuit 131 is designed as shown in FIG. 11, for example. In the scan line interpolating circuit 131, the number of scan lines of the double-rate signal VDU having 1050 vertical scan lines is increased by interpolation to achieve an HDTV signal VHD5 having 1125 vertical scan lines.

Further, the image display device 100C has a change-over switch 117 for selectively outputting the HDTV signal VHD3 obtained in the scan line number converting portion 103 or the HDTV signal VHD5 obtained in the scan line interpolating circuit 131. The HDTV signal VHD3 is supplied to the fixed terminal a of the change-over switch 117, and the HDTV signal VHD5 is supplied to the fixed terminal b. The switching operation of the change-over switch 117 is carried out on the basis of a switching control signal SWC1 supplied from the external. The HDTV signal output from the change-over switch 117 is supplied to the fixed terminal b of the change-over switch 110.

The other construction of the image display device 100C is the same as the image display device 100 of FIG. 1.

Next, the operation of the image display device 100C will be described.

When the change-over switch 110 is switched to the side a by the switching control signal SWC, the HDTV signal VHD1 input to the input terminal 101 is supplied through the side a of the change-over switch 110 to the cathode ray tube 108. Accordingly, in this case, the image based on the HDTV signal VHD1 is displayed on the cathode ray tube 108.

When the change-over switch 110 is switched to the side b by the switching control signal SWC and the change-over switch 117 is switched to the side a by the switching control signal SWC1, the HDTV signal VHD3 achieved in the scan line number converting portion 103 is supplied through the side a of the change-over switch 117 and the b side of the change-over switch 110 to the cathode ray tube 108. Accordingly, in this case, the image based on the HDTV signal VHD3 is displayed on the cathode ray tube 108.

As described above, the portion of the 960 effective scan lines of the double-rate signal VDU is directly contained in the HDTV signal VHD3, so that the image to be displayed on the cathode ray tube 108 on the basis of the HDTV signal VHD3 concerned never suffers such degradation as occurs when the scan line number is converted by the linear interpolation and thus the image quality is more enhanced.

When the change-over switch 110 is switched to the side b by the switching control signal SWC and the change-over switch 117 is switched to the side b by the switching control signal SWC1, the HDTV signal VHD5 achieved in the scan line interpolating circuit 130 is supplied through the side b of the change-over switch 117 and the b side of the change-over switch 110 to the cathode ray tube 108. Accordingly, in this case, the image based on the HDTV signal VHD5 is displayed on the cathode ray tube 108.

As described above, the HDTV signal VHD5 is achieved by increasing the scan line number of the double-ray signal VDU through the interpolation calculation. Accordingly, no contraction in the vertical direction occurs in the image based on the HDTV signal VHD5.

As described above, the image display device 100C shown in FIG. 8 has the scan line number converting portion 103 and the scan line interpolating circuit 131, and it can selectively use one of the HDTV signal VHD3 achieved in the scan line number converting portion 103 and the HDTV signal VHD5 achieved in the scan line interpolating circuit 115. That is, when an image having high image quality is required, the HDTV signal VHD3 maybe used. When an image having no contraction in the vertical direction is required, the HDTV signal VHD5 may be used.

Next, a fifth embodiment according to the present invention will be described.

Figure 9A:
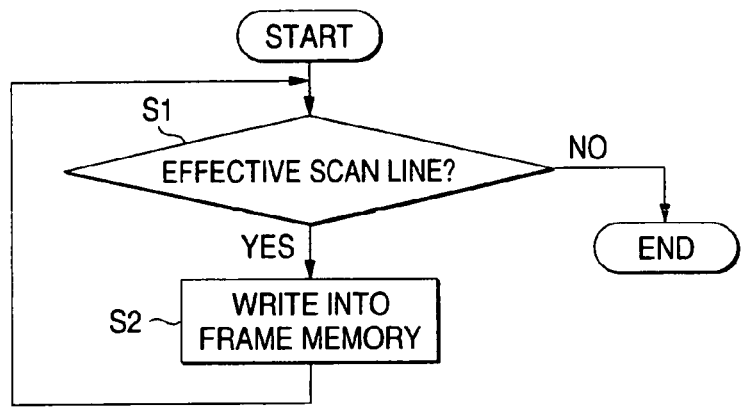
FIG. 9 is a flowchart showing a video signal processing method according to a fifth embodiment of the present invention.
Figure 9B:
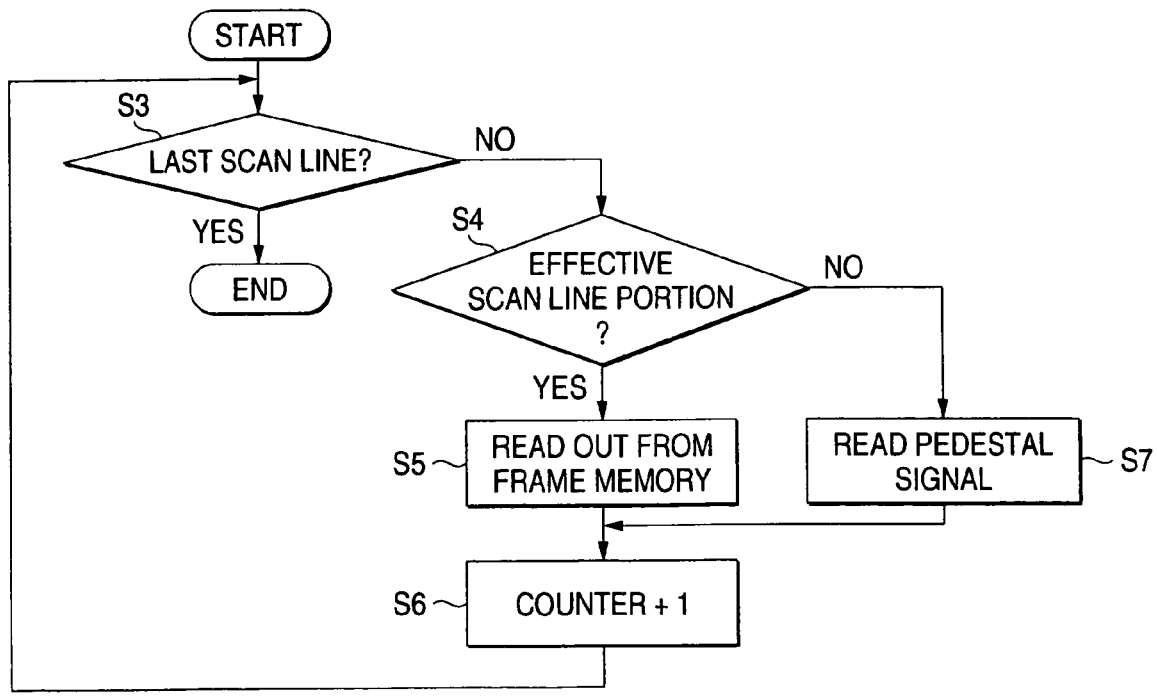

FIGS. 9A and 9B are flowcharts showing a video signal processing method according to the fifth embodiment of the present invention, wherein FIG. 9A shows a writing flow, and FIG. 9B shows a reading flow.

The writing operation will be described with reference to the flowchart of FIG. 9A First, it is judged in step S1 whether an input double-rate signal is an effective scan line or not. If it is judged that the double-rate signal is an effective scan line, the double-rate signal is written into a frame memory in step S2. That is, in this steps, only a double-rate signal which is judged to be an effective scan line is written in the frame memory. The steps S1 and S2 form a loop and the writing is carried out on the overall effective scan line. If it is judged in step S1 that the double-rate signal is not an effective scan line, this flow is finished.

Next, the reading operation will be described with reference to the flowchart of FIG. 9B.

First, in step S3, a scan line number is counted on the basis of vertical and horizontal reference signals VDo, HDo, and it is judged whether the counting on the first to last scan lines of the HDTV signal is completed. If "NO" is judged in step S3, the processing goes to step S4 to judge whether the count value corresponds to an effective scan line portion. If it is judged in step S4 that the count corresponds to the effective scan line portion, the signal of one scan line is read out from the frame memory in step S5 and then the count is incremented by one in step S6.

If it is judged in step S4 that the count does not correspond to an effective scan line portion, a pedestal level signal stored in ROM is read out by the amount corresponding to one scan line in step S7, and the count is incremented by one in step S6.

When the processing of the step S6 is finished, the processing returns to step S3 to successively read out signals stored in the frame memory or ROM. If it is judged in step S3 that the counting on the first to last scan lines has been completed, the counter is reset and a series of flow processing is finished.

That is, in the reading operation from the step S3 to the step S6, the effective scan line portion of the HDTV signal is read out from the frame memory on the basis of the vertical and horizontal reference signals VDo, HDo, and after the reading operation is finished, the pedestal level signal stored in ROM is subsequently read out. Accordingly, the pedestal level signals are added to the 960 HDTV signals corresponding to the 960 effective scan lines of the double-rate signal to achieve the HDTV signal having 1125 vertical scan lines. The HDTV signal thus achieved does not suffer any degradation which occurs when the scan line number is converted by the linear interpolation, and it has high image quality.

In the above embodiment, the writing operation and the reading operation are separately shown by using different flows. However, it is unnecessary to carry out these operations at different timings. This is because the double-rate signal may be input in the middle of the reading operation. In this case, information of two fields can be separately processed by using a frame memory, and thus the reading operation is started for a field for which the writing operation is completed while the writing operation is started for a next field.

Next, a sixth embodiment according to the present invention will be described.

Figure 10:
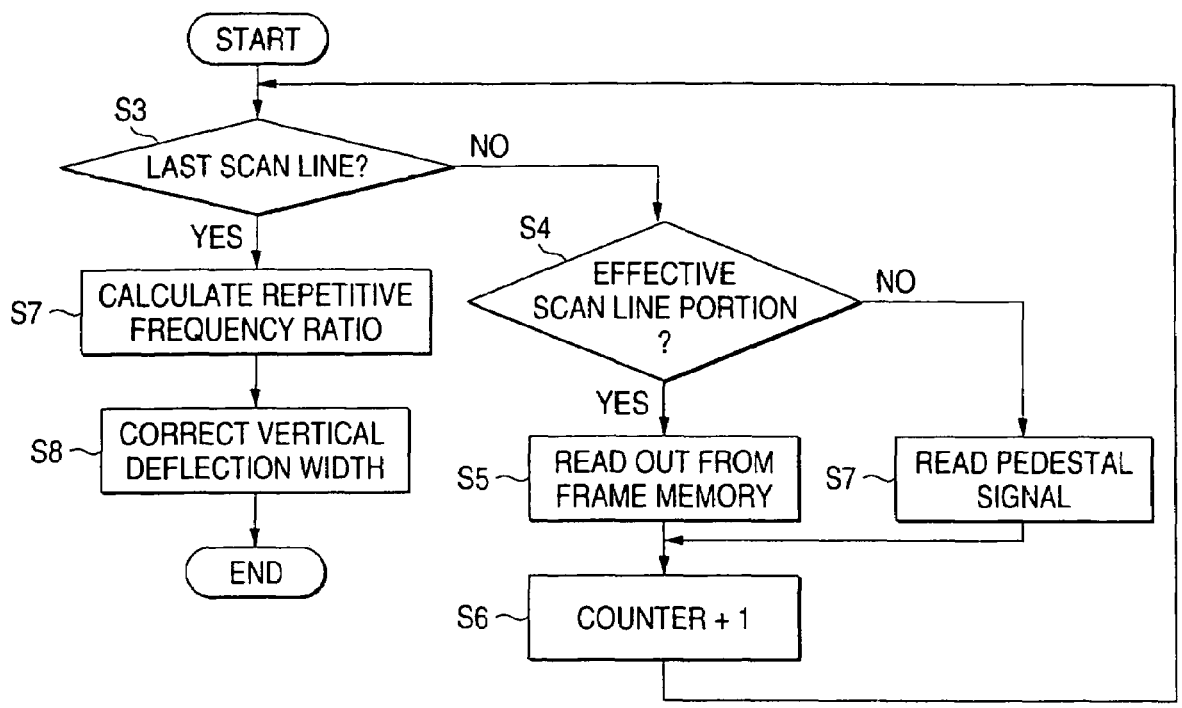
FIG. 10 is a flowchart showing a video signal processing method according to a sixth embodiment of the present invention.

FIG. 10 shows a flowchart showing a video signal processing method according to the sixth embodiment. In FIG. 10, the steps from S3 to S6 are the same as those of FIG. 9B, and the description thereof is omitted.

If it is judged in step S3 that the counting on the first to last scan lines has been completed, the counter is reset. Subsequently, in step S7, the ratio in repetitive frequency between the vertical reference signal and the signal achieved by multiplying the horizontal synchronous signal of the double-rate signal is calculated. In step S8, the vertical deflection width is corrected on the basis of the ratio thus calculated, and a series of flow processing is finished.

As described above, according to the image converting method shown in FIG. 10, as in the case of the image converting method shown in FIGS. 9A and 9B, there occurs no degradation and an image having high image quality can be achieved. In addition, the contraction in the vertical direction can be excellently prevented.

For example, when the conversion from the HDTV signal to the double-rate signal is carried out, the scan line number of the pedestal level signal is reduced. Further, in order to correct the expansion in the vertical direction of the image due to the reduction in vertical line number, the deflection width in the vertical direction of the cathode ray tube may be reduced or the number of pixel signals of each scan line of the double-rate signal after the conversion may be increased, thereby achieving another double-rate signal in which a part of each of the pixel signals of each scan line concerned is set as each of the pixel signals of each scan line.

Further, in the above-described embodiments, the conversion from the double-rate signal to the HDTV signal is carried out by the scan line number converting portion 103 and the scan line number converting portion 130. However, the present invention can be likewise applied to the conversion from the HDTV signal to the double-rate signal or the conversion between systems which are different in vertical scan line number.

FIG. 11 is a block diagram showing the construction of an image display device for converting an input signal having 720 P in format (vertical scan line number: 750 lines, effective scan line number: 720 lines) to an HDTV signal according to a seventh embodiment.

In FIG. 11, a P→I (progressive interlace) converting portion 132 is equipped at the front stage of the scan line number converting portion 103 of FIG. 1. The other corresponding portions are represented by the same reference numerals, and the detailed description is omitted.

In the P→I converting portion 132, the conversion is carried out so that a first field n of the input signal of 720 P in format is constructed by only odd-numbered scan lines and a next field (n+1) is constructed by only even-numbered scan lines, whereby the input signal of 720 P is converted to an interlace signal of 360 lines. In the scan line number converting portion 103 at the subsequent stage, the interlace signal of 360 lines is converted to the HDTV signal containing 360 effective scan lines per field.

Figure 12:
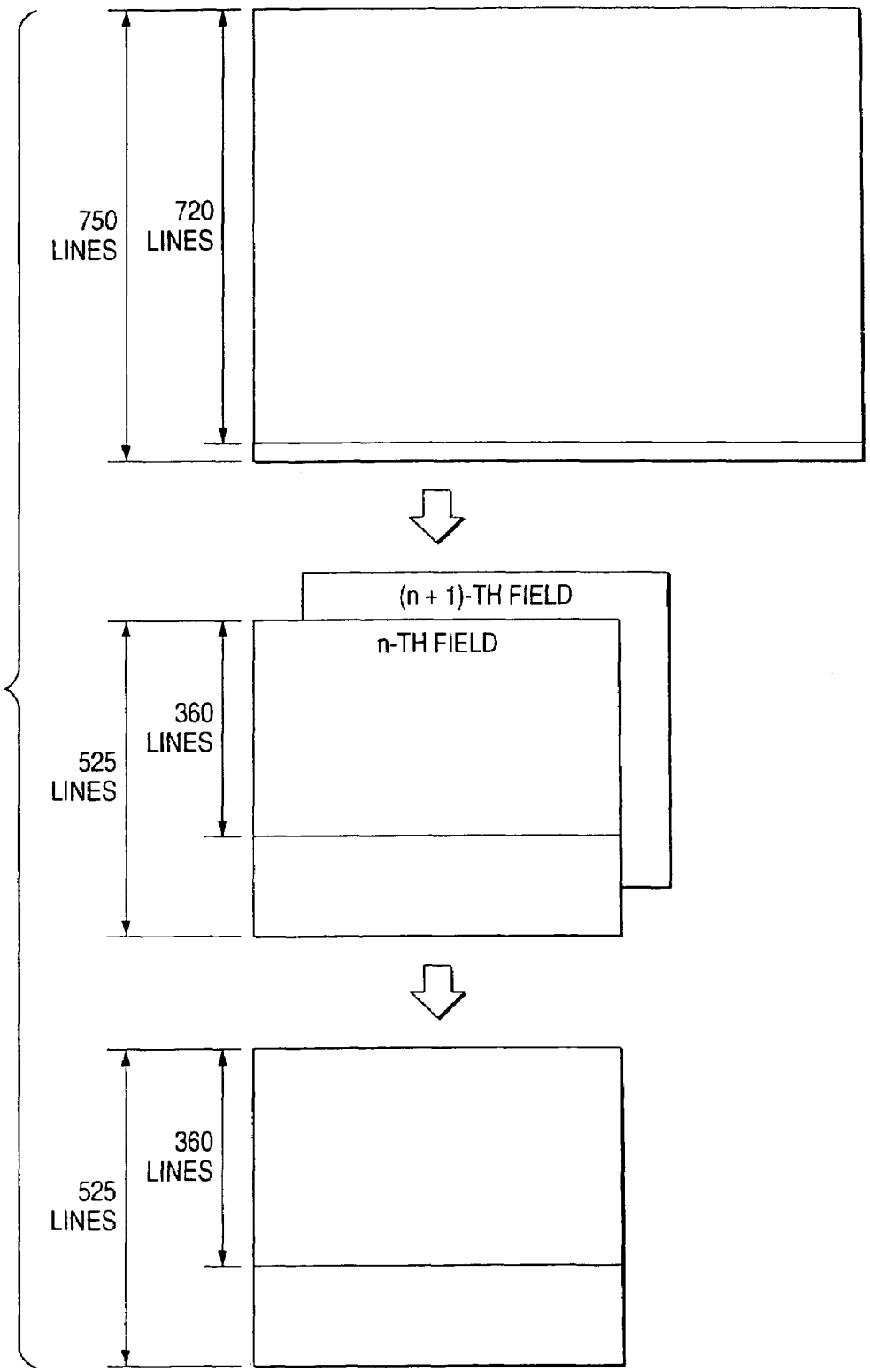
FIG. 12 shows the association relationship in scan line among a signal Vp of 720 P, an interlace signal Vi of 360 lines and an HDTV signal VHD3.
Figure 13:
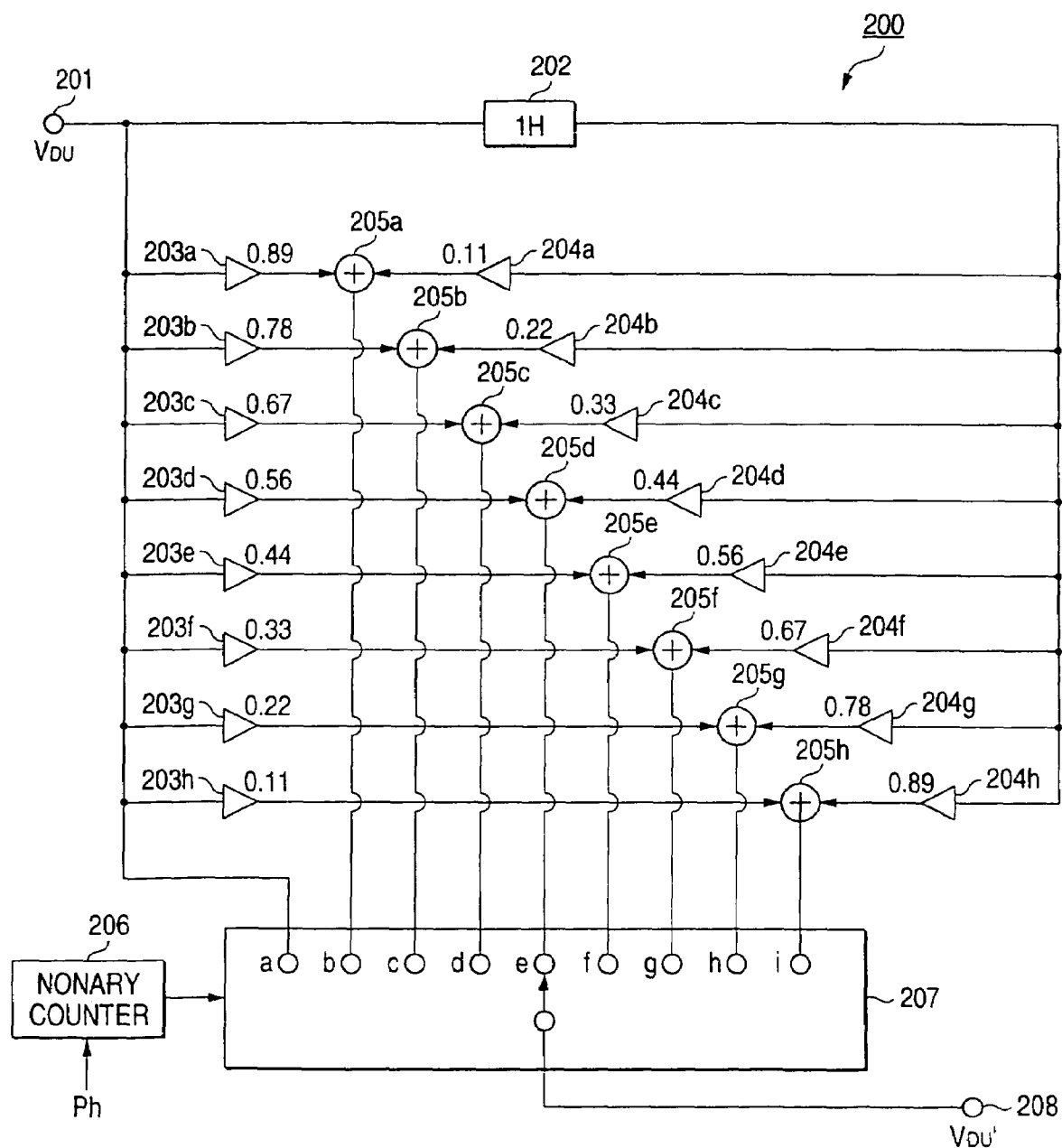
FIG. 13 is a block diagram showing the construction of a scan line interpolating circuit.
Figure 14:
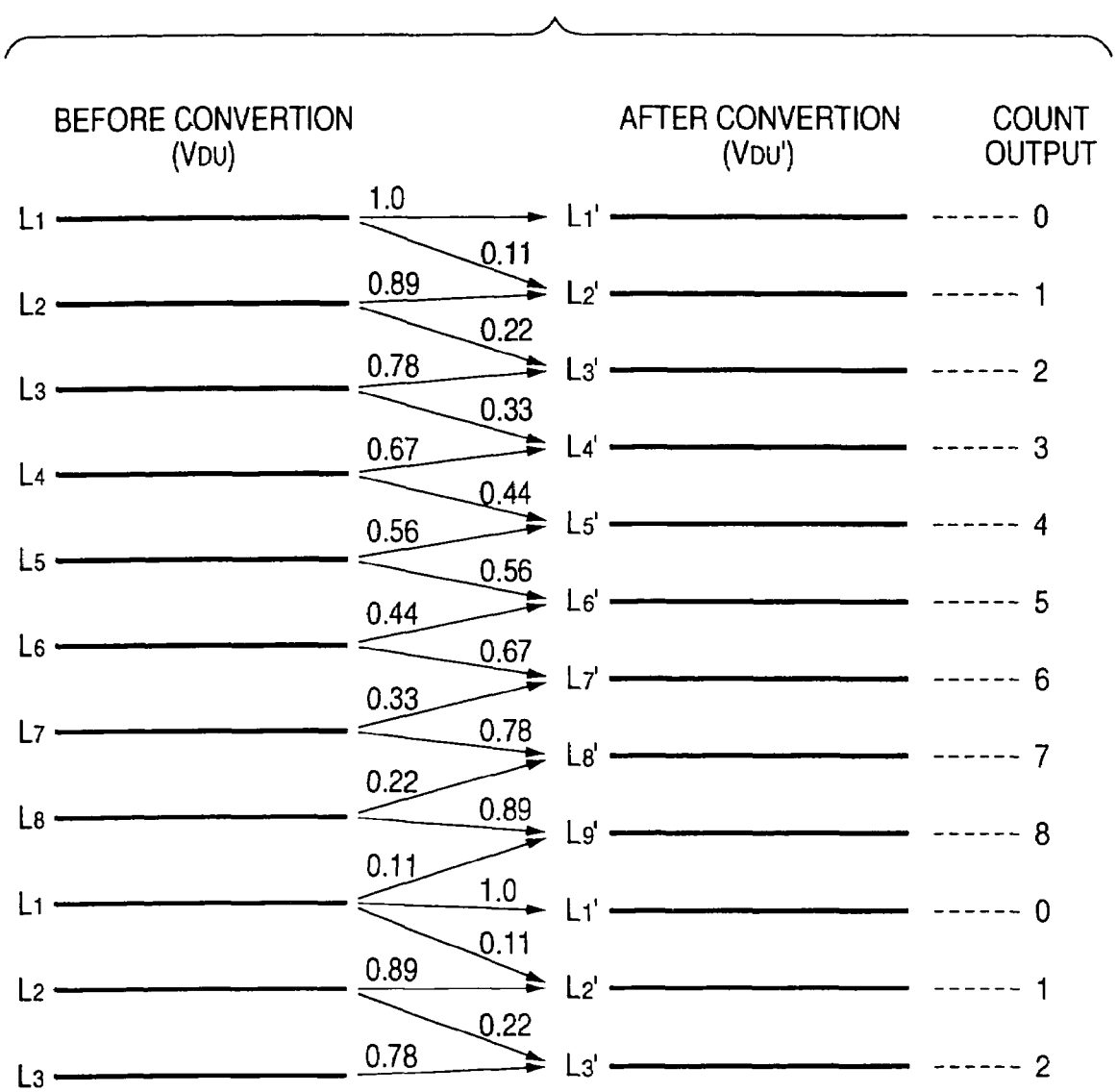
FIG. 14 is a diagram showing the interpolation of scan lines.

FIG. 12 shows the association relationship in scan line among the input signal Vp of 720 P, the interlace signal of 360 lines Vi and the HDTV signal VHD3, which are illustrated in this order from the left side.

What is claimed is:

1. A video signal processing circuit for converting a first video signal of a first system having a first number of vertical scan lines to a second video signal of a second system having a second number of vertical scan lines greater than said first number, and wherein said first number of vertical scan lines having a portion of effective scan lines and a portion of scan lines of a pedestal level signal of unvaried value, comprising:
   a frame memory for storing successive frames of said first video signal;
   a writing controller for writing the portion of effective scan lines of said first video signal into said frame memory in synchronism with vertical and horizontal synchronous signals corresponding to the first video signal of the first system;
   a reading controller for reading the portion of the effective scan lines of the video signal written in said frame memory in synchronism with vertical and horizontal reference signals corresponding to the second video signal;
   a first signal selector for selectively outputting one of the video signal read out from said frame memory and the pedestal level signal, wherein said reading controller controls said signal selector so as to select the output from said frame memory while reading out the portion of the effective scan lines and to select the pedestal level signal, when finished reading the effective scan lines; and
   a vertical size controller for changing a vertical deflection width in accordance with a ratio of a repetitive frequency of the horizontal reference signal corresponding to the second video signal achieved by multiplying the horizontal synchronous signal corresponding to the first video signal.

2. The video signal processing circuit as claimed in claim 1, further comprising a horizontal pixel number converter for reducing or increasing a number of pixels of each scan line of the video signal of the second video system from said frame memory in accordance with a ratio of an effective scan line number of the first video signal to an effective scan line number of the second video signal.

3. A video signal processing method for converting a first video signal of a first system having a first number of vertical scan lines to a second video signal of a second system having a second number of vertical scan lines greater than said first number, and wherein said first number of vertical scan lines having a portion of effective scan lines and portion of scan lines of a pedestal level signal of unvaried value, comprising:
   a writing step of writing a portion of the effective scan lines of said first video signal into a frame memory in synchronism with signals achieved by multiplying vertical and horizontal synchronous signals corresponding to the first video signal of the first system;
   a reading control step of reading out the portion of the effective scan lines of the video signal written in said frame memory in synchronism with vertical and horizontal reference signals corresponding to the second video signal;
   a reading selection step of selectively reading out one of the signal read out from the frame memory and the pedestal level signal, wherein the reading control step controls the reading selection step so as to select the output from the frame memory while reading out the portion of the effective scan lines and to select the pedestal level signal, when finished reading out the effective scan lines;
   a calculating set of calculating a ratio between a repetitive frequency of the horizontal reference signal corresponding to the video signal of the second video system and a repetitive frequency of a signal achieved by multiplying the horizontal synchronous signal corresponding to the video signal of the first video system; and
   a correcting step of correcting a vertical deflection width in accordance with the ratio calculated in said calculating step.

* * * * *